United States Patent [19]

Schmidt

[11] Patent Number: 4,722,142

[45] Date of Patent: Feb. 2, 1988

[54] COATING THICKNESS GAUGE

[75] Inventor: Thomas R. Schmidt, Houston, Tex.

[73] Assignee: Shell Oil Company, Houston, Tex.

[21] Appl. No.: 789,344

[22] Filed: Oct. 16, 1985

Related U.S. Application Data

[63] Continuation of Ser. No. 448,543, Dec. 10, 1982, abandoned.

[51] Int. Cl.$^4$ ................................................ G01B 7/06
[52] U.S. Cl. ................................ 33/169 F; 33/178 E; 33/178 F
[58] Field of Search .............. 33/169 F, 178 F, 178 E; 324/229, 230, 220, 221, 228

[56] References Cited

U.S. PATENT DOCUMENTS

| | | | |
|---|---|---|---|
| 2,581,394 | 1/1952 | Dinger | 324/230 X |
| 2,751,552 | 6/1956 | Brenner et al. | 324/230 |
| 2,973,583 | 3/1961 | Stolle et al. | 33/178 F |
| 3,260,927 | 7/1966 | Young | 324/230 |
| 3,443,211 | 5/1969 | Wood et al. | 324/220 X |
| 3,496,457 | 2/1970 | Proctor et al. | 324/220 |
| 4,005,360 | 1/1977 | Ott | 324/230 |
| 4,330,748 | 5/1982 | Holden | 324/220 X |
| 4,349,780 | 9/1982 | Zuber et al. | 324/229 X |

FOREIGN PATENT DOCUMENTS

| | | | |
|---|---|---|---|
| 142822 | 7/1980 | Fed. Rep. of Germany | 33/169 F |
| 75608 | 6/1980 | Japan | 33/169 F |
| 129022 | 12/1959 | U.S.S.R. | 324/230 |
| 0607136 | 5/1978 | U.S.S.R. | 324/230 |

Primary Examiner—Harry N. Haroian

[57] ABSTRACT

An apparatus for measuring the thickness of a coating on the inside wall of a metallic tubular member comprising: a housing; means for positioning the housing in a predetermined position in relation to the inside wall; a probe comprising means for following the contour of the surface of the coating, and means for sensing the distance between the contour following means and the inside wall as an indication of the thickness of the coating; and means for attaching the probe to the housing such that the probe is positioned in a predetermined position in relation to the inside wall.

14 Claims, 4 Drawing Figures

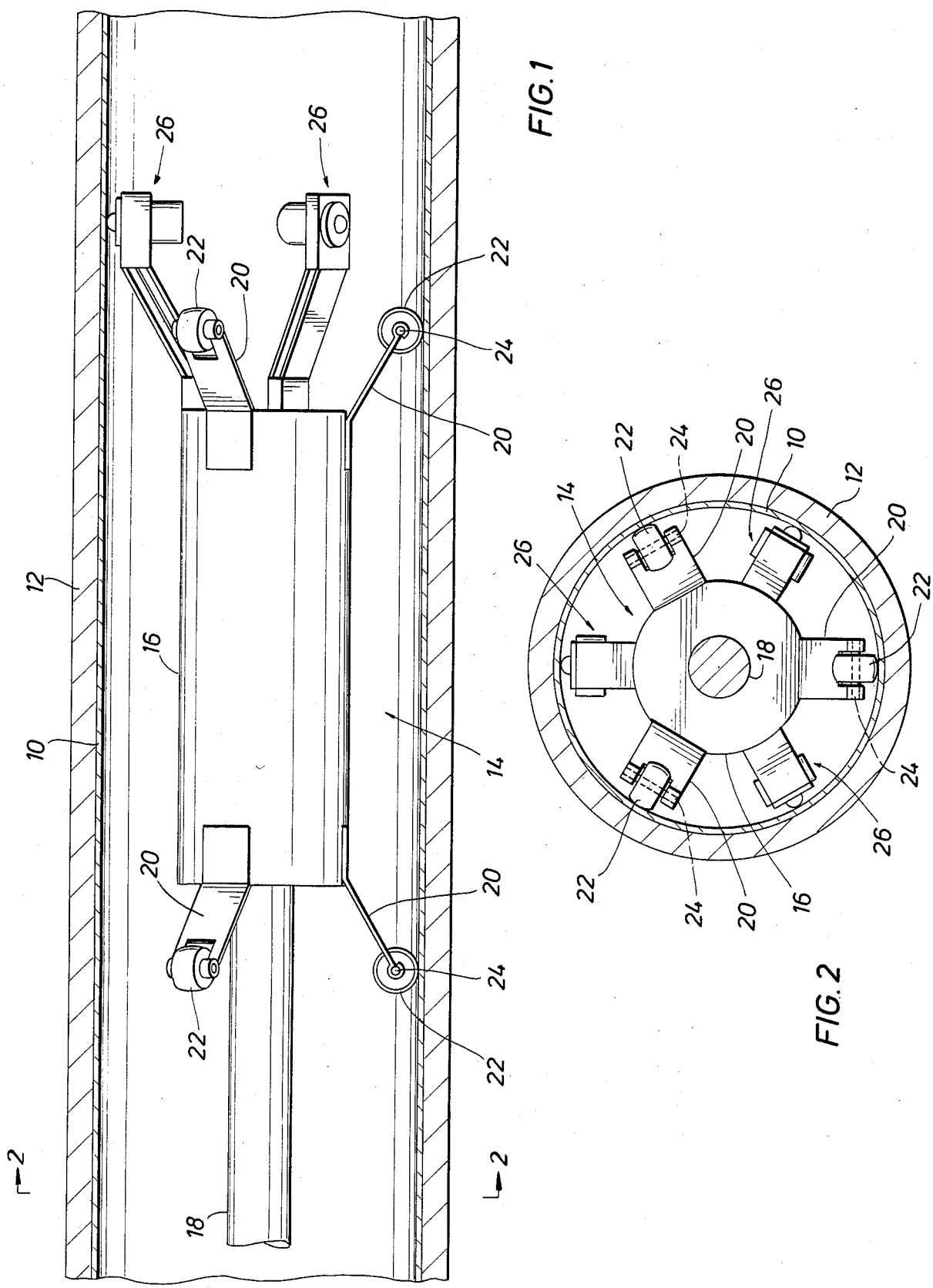

COATING THICKNESS GAUGE

This is a continuation of application Ser. No. 448,543, filed Dec. 10, 1982, now abandoned.

BACKGROUND OF THE INVENTION

This invention relates to an apparatus for measuring the thickness of a coating that is not highly conductive, such as plastic, on the inside wall of a metallic tubular member and, more particularly, to an apparatus for measuring the thickness of such coating throughout the length of the tubular member.

SUMMARY OF THE INVENTION

In accordance with the present invention there is provided an apparatus for measuring the thickness of a coating on the inside wall of a metallic tubular member. The subject apparatus comprises a probe which includes means for following the contour of the surface of the coating and means for sensing the distance between the contour following means and the inside wall of the tubular member as an indication of the thickness of the coating. The probe is attached to a housing by attaching means such that the probe is positioned in a predetermined position in relation to the inside wall of the tubular member. The housing is provided with means for positioning the housing at a predetermined position in relation to the inside wall, and the housing is further provided with means for moving the housing through the tubular member. The present invention continuously measures the coating thickness at it is moved through the tubular member or pipe. The measurements can be performed either before the pipe is installed, such as when it is sitting in a rack or other storage means, or after it has been installed, such as a pipeline or well tubing.

In the preferred embodiment of the invention the probe is attached to the housing by two cantilevered flexible members that are attached to the housing and the probe such that the two members are parallel; this arrangement positions the probe such that it is perpendicular to the surface of the coating. The contour following means of the probe comprises a ruby hemisphere that contacts the surface of the coating; however, other hard and durable materials can be used to track the coating surface. The curvature of the contour following means should be less than the minimum pit curvature to be followed. The sensing means, which can be an electronic eddy current loss proximity detector or the like, senses the distance from the sensor to the pipe wall. Since the distance between the sensor and the outer surface of the ruby hemisphere is known and can be subtracted from the total distance sensed by the sensing means, the additional distance between the sensing means and the inside wall of the pipe is directly proportional to the thickness of the coating. If desired, the sensing means can be connected to a recording device for recording the distance sensed by the sensing means.

In addition, the housing is provided with a plurality of flexible cantilevered members that are mounted on each end of the housing. Each cantilevered member has a wheel mounted for rotation at the unattached end of the member; each of the wheels contacts the surface of the coating. These flexible cantilevered members are employed to position the housing in a predetermined relationship to the inside wall, such as centered inside the pipe. Certainly, other arrangements can be employed in place of the cantilevered members for positioning the housing. For example, flexible members which have both ends attached to the housing and a center portion which contacts the surface of the coating can be employed. A plurality of probes positioned around the circumference of the housing can be employed to sense the thickness of the coating at different locations in the pipe, or, alternatively, the apparatus can be moved through the pipe, rotated and then moved through the pipe again at a different location.

Other objects, advantages and applications of the present invention will be made apparent by the following detailed description of the preferred embodiments of the present invention.

BRIEF DESCRIPTION OF THE DRAWINGS

FIG. 1 is a side view in elevation of the coating thickness gauge of the present invention.

FIG. 2 is an end view in elevation of the coating thickness gauge shown in FIG. 1.

DETAILED DESCRIPTION OF THE PREFERRED EMBODIMENTS

Figure 3:
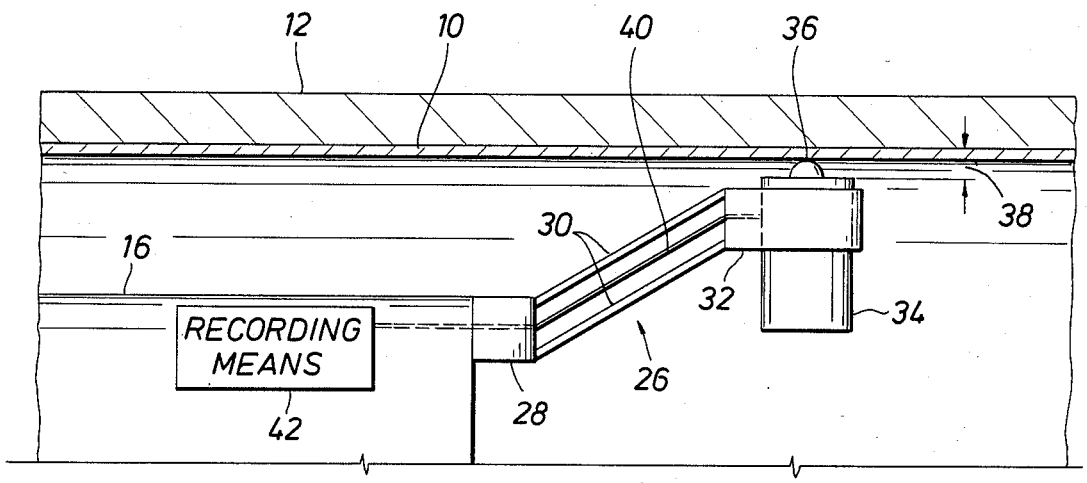
FIG. 3 is a detailed diagram of the probe portion of the coating thickness gauge shown in FIGS. 1 and 2.

Referring to FIGS. 1 and 2, a gauge for measuring the thickness of coating 10 on the inside wall of pipe 12 is indicated generally by numeral 14. Pipe 12 can be any metallic tubular member, and coating 10 can be any material that is not highly conductive, for example, plastic. Gauge 14 has a cylindrical housing 16 which has a rod 18 connected to one end thereof. Rod 18 has a length suitable for use with the pipe to be tested so that gauge 14 can be pushed through the pipe from one end to the other. Rod 18 can be advanced automatically by a motor or other drive means, or it can be advanced manually by an operator. In addition, other means, for example, a cable for pulling gauge 14, can be used to move gauge 14 through pipe 12. Housing 16 has a plurality of flexible members 20 attached to each end by any suitable means such as welding. The other end of members 20 have a wheel 22 mounted on an axle 24 for rotation. Members 20 are flexible so that wheels 22 can follow the contour of the surface of coating 10 while housing 16 is maintained in the center of pipe 12. The end of housing 16 that is opposite to the end to which rod 18 is attached has a plurality of probes 26 positioned around its circumference. The unattached end of each of probes 26 is in contact with the surface of coating 10. Probes 26 are discussed hereinbelow in detail in relation to FIG. 3. As shown in FIGS. 1 and 2, gauge 14 has three probes 26 for sensing the thickness of coating 10 at three different locations inside of pipe 12; however, any number of probes 26 can be used so that gauge 14 can have one or more probes 26.

FIG. 3 provides a detailed view of probe 26 shown in FIGS. 1 and 2. One end of each of two flexible members 30 is attached to projection 28 of housing 16, and the other end of each of members 30 is connected to frame 32. Members 30 can be attached by any suitable means, such as welding. Sensor 34 is mounted in fraame 32, and a ruby hemisphere 36 is mounted adjacent sensor 34 such that ruby hemisphere 36 contacts the surface of coating 10. Members 30 are mounted such that they are parallel to one another and form a parallelogram with the surface of projection 28 and the surface of frame 32; this parallelogram configuration in combination with the flexible nature of members 30 ensures that ruby hemisphere 36 and sensor 34 are positioned perpendicular to the surface of coating 10, thereby providing a consistently accurate reading. Sensor 34 senses distance 38 which consists of the width of ruby hemisphere 36 and the thickness of coating 10. Preferably, sensor 34 is an electronic eddy current loss proximity detector; however, any suitable proximity detector can be used. The output of sensor 34 is provided to recording means 42 on output line 40. Recording means 42 can be positioned inside of housing 16 or can be positioned outside of pipe 12. Since the width of ruby hemisphere 36 is known and constant, the output signals recorded by recording means 42 are directly proportional to the thickness of coating 10.

Figure 4:
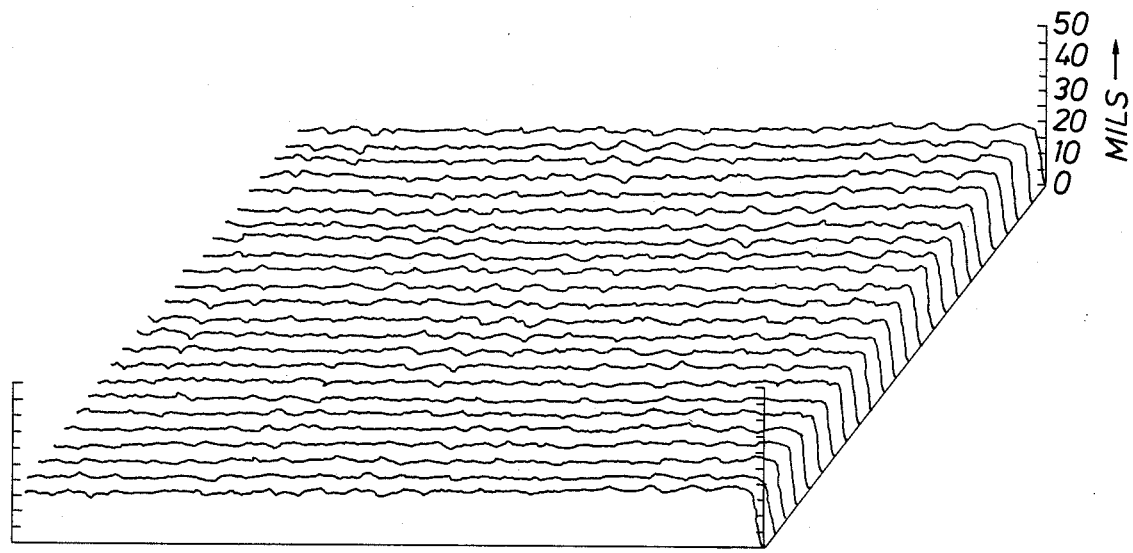
FIG. 4 illustrates a typical trace obtained by making a plurality of passes through a pipe with the coating thickness gauge of the present invention.

FIG. 4 illustrates a typical plot obtained with a gauge according to the present invention. The pipe tested consisted of a 7-foot section of 2-inch pipe which had a plastic coating on its inside wall. The plastic had been removed from the end of the pipe to give a zero coating thickness check on the scan. Twenty-four repetitive scans were run with a single probe unit to develop the scan pattern illustrated in FIG. 4.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the foregoing disclosure.

What is claimed is:

1. Apparatus for measuring the thickness of a non-conductive coating on the inside wall of a metallic tubular member, comprising:
   (a) a housing,
   (b) support means on said housing for movably supporting said housing within such a tubular member for longitudinal movement therein,
   (c) at least one proximity sensor for continuously sensing the distance to a metallic member,
   (d) proximity sensor mounting means for mounting each said proximity sensor on said housing for substantially perpendicular contact with the inside wall of the tubular member when located therein, each said proximity sensor mounting means including:
      (i) means for urging said sensor substantially perpendicularly toward the tubular member inside wall while permitting predetermined radial movement of said sensor with respect thereto as said apparatus is moved longitudinally within the tubular member, and
      (ii) singular non-magnetic contour following means connected to said proximity sensor for continuously contacting the non-conductive coating on the inside wall of the tubular member and, as said apparatus is moved longitudinally within the tubular member, continually separating said proximity sensor from the non-conductive coating by a known width of said contour following means, and
   (e) indicating means responsive to each said proximity sensor for continually indicating the thickness of the non-conductive coating on the inside wall of the tubular member as a predetermined function directly proportional to the thickness of the non-conductive coating and said width of said contour following means, to measure continuously the thickness of the coating as said apparatus is moved along longitudinally within the tubular member.

2. The apparatus of claim 1 further comprising moving means for moving said apparatus longitudinally through the tubular member while said continuous measurements of the coating thickness are being made.

3. The apparatus of claim 1 wherein said indicating means further comprises means for recording the output signals from each said proximity sensor.

4. The apparatus of claim 1 wherein said contour following means is a ruby hemisphere.

5. The apparatus of claim 1 wherein said proximity sensor is an electronic eddy current loss proximity detector.

6. The apparatus of claim 1 wherein said proximity sensor mounting means further comprises two substantially parallel cantilevered flexible members for each said proximity sensor connecting each said sensor to said housing in a parallelogram configuration for maintaining said substantially perpendicular contact of said proximity sensor with the inside wall of the tubular member.

7. The apparatus of claim 1 wherein said support means on said housing further comprises longitudinally spaced-apart wheels for keeping said housing axially aligned within the tubular member while being moved longitudinally therein.

8. Apparatus for measuring the thickness of a non-conductive coating on the inside wall of a metallic member, comprising:
   (a) a housing,
   (b) support means on said housing including longitudinally spaced-apart wheels for movably supporting said housing within such a tubular member for longitudinal movement therein and for keeping said housing axially aligned and substantially centered within the tubular member at substantially all rotated positions therein while being thus moved,
   (c) at least one electronic eddy current loss proximity sensor for continuously sensing the distance to a metallic member,
   (d) proximity sensor mounting means for mounting each said proximity sensor on said housing for substantially perpendicular contact with the inside wall of the tubular member when located therein, each said proximity sensor mounting means including:
      (i) two substantially parallel cantilevered flexible members connecting each said sensor to said housing in a parallelogram configuration for urging said sensor substantially perpendicularly toward the tubular member inside wall and maintaining substantially perpendicular contact of said proximity sensor with the inside wall of the tubular member while permitting predetermined radial movement of said sensor with respect thereto as said apparatus is moved longitudinally within the tubular member, and
      (ii) singular non-magnetic ruby hemisphere contour following means connected to said proximity sensor for continuously contacting the non-conductive coating on the inside wall of the tubular member and, as said apparatus is moved longitudinally within the tubular member, continually separating said proximity sensor from the non-conductive coating by a known width of said contour following means, (e) indicating means responsive to the output signals from each said proximity sensor for continually indicating and recording the thickness of the non-conductive coating on the inside wall of the tubular member as a predetermined function directly proportional to the thickness of the non-conductive coating and said width of said contour following means, to measure continuously the thickness of the coating as said apparatus is moved along longitudinally within the tubular member, and (f) moving means for moving said apparatus longitudinally through the tubular member while said continuous measurements of the coating thickness are being made.

9. A method for measuring the thickness of a non-conductive coating on the inside wall of a metallic tubular member, comprising:

(a) movably supporting at least one proximity sensor within such a tubular member for longitudinal movement therein, (b) with the proximity sensor, continuously sensing the distance to the metallic tubular member, (c) urging the sensor substantially perpendicularly toward the tubular member inside wall for substantially perpendicular contact with the inside wall thereof, (d) permitting predetermined radial movement of the sensor with respect to the tubular member inside wall as the apparatus is moved longitudinally within the tubular member, (e) as the sensor is moved longitudinally within the tubular member, continuously contacting the non-conductive coating on the inside wall of the tubular member with a singular non-magnetic contour following means connected to the proximity sensor and continually separating the proximity sensor from the non-conductive coating by a known width of the contour following means, and (f) continually indicating the thickness of the non-conductive coating on the inside wall of the tubular member as a predetermined function directly proportional to the thickness of the non-conductive coating and the width of the contour following means, to measure continuously the thickness of the coating as the sensor is moved along longitudinally within the tubular member.

10. The method of claim 9 further comprising recording the output signals from each proximity sensor.

11. The method of claim 9 wherein said step of contacting the non-conductive coating on the inside wall of the tubular member further comprises contacting the wall with a ruby hemisphere.

12. The method of claim 9 wherein said step of sensing the distance to the metallic tubular member further comprises sensing the distance with an electronic eddy current loss proximity detector.

13. The method of claim 9 wherein said steps of supporting the proximity sensor, urging the sensor, and permitting radial movement of the sensor further comprise mounting the sensor on two substantially parallel cantilevered flexible members connecting the sensor in a parallelogram configuration to a housing movably disposed in the tubular member, for maintaining the substantially perpendicular contact of the proximity sensor with the inside wall of the tubular member.

14. A method for measuring the thickness of a non-conductive coating on the inside wall of a metallic tubular member, comprising:

(a) movably supporting at least one electronic eddy current loss proximity sensor on two substantially parallel cantilevered flexible members connecting the sensor in a parallelogram configuration to a housing movably disposed in the tubular member, and centering the housing within the tubular member at substantially all rotated positions therein, (b) with the proximity sensor, continuously sensing the distance to the metallic tubular member, (c) urging the sensor substantially perpendicularly toward the tubular member inside wall for substantially perpendicular contact with the inside wall thereof, (d) permitting predetermined radial movement of the sensor with respect to the tubular member inside wall as the apparatus is moved longitudinally within the tubular member, (e) as the sensor is moved longitudinally within the tubular member, continuously contacting the non-conductive coating on the inside wall of the tubular member with a singular non-magnetic ruby hemisphere contour following means connected to the proximity sensor and continually separating the proximity sensor from the non-conductive coating by a known width of the contour following means, (f) continually indicating the thickness of the non-conductive coating on the inside wall of the tubular member as a predetermined function directly proportional to the thickness of the non-conductive coating and the width of the contour following means, to measure continuously the thicknes of the coating as the sensor is moved along longitudinally within the tubular member, and (g) recording the output signals from each proximity sensor.

* * * * *